United States Patent Office 3,749,780
Patented July 31, 1973

3,749,780
METHOD OF TREATING MALARIA WITH 3-(p-CHLOROPHENYL) - 6 - LOWER ALKYL-AMINO OR DILOWER ALKYLAMINO-s-TETRAZINES
Redginal Irving Hewitt, Spring Valley, N.Y., assignor to American Cyanamid Company, Stamford, Conn.
No Drawing. Filed Apr. 5, 1971, Ser. No. 131,411
Int. Cl. A61k *27/00*
U.S. Cl. 424—244                    3 Claims

ABSTRACT OF THE DISCLOSURE

New compositions comprising 3-(p-chlorophenyl)-6-lower alkylamino or dilower alkylamino-s-tetrazines and a pharmaceutically acceptable carrier are described. A method of treating malaria with the compositions is also described.

appropriate treated infected controls are included (i.e., treatment with chloroquine or pyrimethamine). Determinations of group (i.e., mean) mouse weights are made on the day of inoculation and on day 3 and 6 postinoculation. The food is weighed before and immediately after the treatment period, and mean daily intakes of the compounds are determined. Giemsa-stained thin blood films are prepared once from 3–10 mice in each treated group on days 7–12 post-inoculation, and the mean parasitemia is compared with that of appropriate untreated controls. Mortality is recorded daily, with an observation period of at least 30 days postinoculation. The survival of treated animals for 30 days is considered indicative of a "curative" effect, although no measures are taken to determine conclusively the presence or absence of parasites at the end of the 30-day period. Median survival times are determined by inspection or through the application of Litchfield's rapid graphic method. The following results were obtained with representative compounds of this invention.

TABLE

Effects of 3-(p-chlorophenyl)-6-substituted amino-s-tetrazine derivatives in blood-induced P. berghei infections in mice

| | Percent diet concentration ×6 days | Approx. mg./kg. per day | Difference in mean mouse weights during treatment, grams | Percent parasite suppression, day 8 | Median survival time days post-inoculation treated/ untreated | Percent survivors/ 5 mice 30 days |
|---|---|---|---|---|---|---|
| $R=N(CH_3)_2$ | 0.2 | 402 | +1.2 | >99 | >30/7 | 100 |
|  | 0.2 | 348 | +1.2 | >99 | >30/7 | 100 |
|  | 0.1 | 196 | +0.4 | >99 | >30/7 | 100 |
| $R=NHCH_3$ | 0.07 | 133 | +2.6 | >99 | >30/7 | 100 |

DESCRIPTION OF THE INVENTION

This invention relates to new compositions of matter. More particularly, it relates to compositions containing as the active components a compound of the formula:

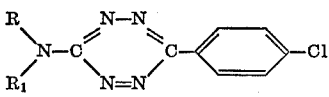

wherein R and $R_1$ are hydrogen and lower alkyl. The term lower alkyl is intended to include those alkyl groups having 1 to 4 carbon atoms.

The compounds of this invention may be prepared by the following method:

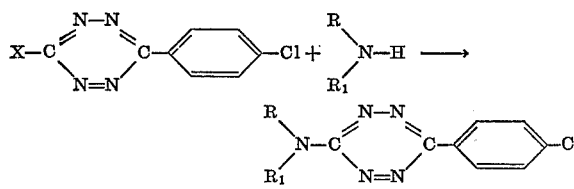

wherein R and $R_1$ are as defined hereinbefore.

The compounds of the present invention are useful for the treatment of malaria in warm-blooded animals. One procedure for determining the anti-malarial activity of the individual compounds against a blood-induced infection is with *P. berghei* in mice is as follows: Mice are inoculated (approximately 1–2 million parasitized red cells per mouse), randomized, and caged in groups of 5 or 10 mice. Drug-diet treatment is initiated within 1–3 hours postinoculation and is continued for 6 successive days (days 0–5 postinoculation). Appropriate groups of untreated controls (both infected and uninfected) are included, and, in most tests involving resistant strains, The chlorophenyltetrazineamines may be administered to warm-blooded animals orally, or parenterally if desired, and when so administered, may be considered as an antimalarial agent for therapeutically desirable treatment of malaria in warm-blooded animals. The dosage regimen can be adjusted to provide optimum therapeutic response. Thus, for example, several doses may be administered daily or the dose may be reduced proportionately as indicated by the requirements of the particular therapeutic situation.

For therapeutic administration the active compounds of this invention may be incorporated with pharmaceutical carriers such as excipients and used, for example, in the form of tablets, dragees, capsules, suppositories, liquids, elixirs, emulsions, suspensions, syrups, or the like. Such compositions and preparations should contain at least 0.1% of active components. The percentage of the compositions and preparations, may, of course, be varied and may conveniently be between 20% and 60% or more of the weight of the unit. The amount of active component in such therapeutically useful compositions or preparations is such that a suitable dosage of 50 mg. to 300 mg./kg./day will be obtained. Preferred compositions or preparations according to the present invention are prepared so that a dosage unit form contains between about 100 and about 1000 milligrams of the chlorophenyltetrazineamines.

The compositions of this invention are therapeutically active as anti-malarials. As such, they can be incorporated in various pharmaceutical forms such as tablets, capsules, pills, and so forth, for immediate or sustained release, by combining with suitable pharmaceutical carriers. They may be in the form of dosage units for a single therapeutic dose or in small units for multiple dosages or in larger units for division into single doses. Obviously, in addition to the therapeutic anti-malarial compound there may be present excipients, binders, fillers, and other therapeutically inert ingredients necessary in the formulation of the desired pharmaceutical preparation.

SPECIFIC DISCLOSURE

The following specific examples illustrate the preparation of representative compounds of the present invention along with formulations of the active components. Parts are by weight unless otherwise indicated.

EXAMPLE 1

Preparation of 3-(p-chlorophenyl)-6-dimethylamino-s-tetrazine

Three grams of 3-bromo-6-(p-chlorophenyl)-s-tetrazine is added to 13.5 grams of anhydrous dimethylamine held in a pressure bottle cooled below 5° C. The bottle is then sealed and allowed to remain at room temperature for sixty hours. After removal of the excess dimethylamine, the crude red reaction product is purified by recrystallization from ethanol; yield, 2.4 grams; melting point 174°–174.5° C.

*Analysis.*—Calcd. for $C_{10}H_{10}N_5Cl$ (percent): N, 29.72. Found (percent): N, 29.63.

The starting 3-bromo-6-(p-chlorophenyl)-s-tetrazine is prepared by the method of V. A. Grakauskas et al., J. Am. Chem. Soc. 80 3155 (1958). The subject compound is described in U.S. Pat. 3,166,399.

EXAMPLE 2

Preparation of 3-(p-chlorophenyl)-6-methylamino-s-tetrazine

The above compound is prepared essentially by the procedure of Example 1, an ethanolic solution of anhydrous monomethylamine being employed in place of dimethylamine. After recrystallization from hot ethanol, the product melts at 205°–207° C.

EXAMPLE 3

Preparation of tablet compositions containing 3-(p-chlorophenyl)-6-dimethylamino-s-tetrazine

|  | G., 1,000 tablets |
|---|---|
| 3-(p-chlorophenyl)-6-dimethylamino-s-tetrazine | 100 |
| Corn starch USP | 300.0 |
| Dibasic calcium phosphate | 2,150.0 |
| Magnesium stearate | 600.0 |

The above ingredients are thoroughly mixed and incorporated into a standard pharmaceutical tablet. Each tablet contains 100 mg. of therapeutic component.

What is claimed is:

1. A method of treating malaria in warm-blooded animals which comprises administering internally to said warm-blooded animals an antimalarial amount of a compound of the formula:

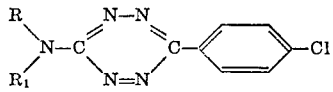

wherein R and $R_1$ are selected from the group consisting of hydrogen and lower alkyl and a pharmaceutically acceptable carrier therefor.

2. A method in accordance with claim 1, wherein the compound is 3-(p-chlorophenyl)-6-dimethylamino-s-tetrazine.

3. A method in accordance with claim 1, wherein the compound is 3-(p-chlorophenyl)-6-methylamino-s-tetrazine.

References Cited

UNITED STATES PATENTS 3,166,399   1/1965   Lutz et al.   260—241

JEROME D. GOLDBERG, Primary Examiner